United States Patent
Tosar et al.

(10) Patent No.: US 9,710,371 B2
(45) Date of Patent: Jul. 18, 2017

(54) TEST FAILURE BUCKETING

(71) Applicant: MICROSOFT TECHNOLOGY LICENSING, LLC, Redmond, WA (US)

(72) Inventors: Juan Alejandro Llanes Tosar, Redmond, WA (US); Eric S. Shamay, Seattle, WA (US); Ziying (Eric) Zheng, Redmond, WA (US); Flore Q Yuan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 104 days.

(21) Appl. No.: 14/924,507

(22) Filed: Oct. 27, 2015

(65) Prior Publication Data

US 2017/0116114 A1    Apr. 27, 2017

(51) Int. Cl.
*G06F 11/00* (2006.01)
*G06F 11/36* (2006.01)

(52) U.S. Cl.
CPC ...... *G06F 11/3692* (2013.01); *G06F 11/3684* (2013.01); *G06F 11/3688* (2013.01)

(58) Field of Classification Search
CPC ............. G06F 11/3684; G06F 11/3688; G06F 11/3692
See application file for complete search history.

(56) References Cited

U.S. PATENT DOCUMENTS

| | | | |
|---|---|---|---|
| 7,219,266 B2 | 5/2007 | Glerum et al. | |
| 7,509,538 B2 | 3/2009 | Triou et al. | |
| 7,694,183 B2 | 4/2010 | Prescott et al. | |
| 8,264,385 B1 | 9/2012 | Dewan et al. | |
| 8,782,609 B2 | 7/2014 | Robinson | |
| 8,799,869 B2 * | 8/2014 | Grechanik | G06F 11/3684 717/126 |
| 9,552,249 B1 * | 1/2017 | James | G06F 11/079 |

(Continued)

OTHER PUBLICATIONS

Kim, et al., "Crash graphs: An aggregated view of multiple crashes to improve crash triage", In Proceedings of IEEE/IFIP 41st International Conference on Dependable Systems & Networks, Jun. 27, 2011, pp. 486-493.

(Continued)

*Primary Examiner* — Joshua P Lottich
(74) *Attorney, Agent, or Firm* — Fiala & Weaver P.L.L.C.

(57) ABSTRACT

Methods, systems, apparatuses, and computer program products are provided for the "bucketing" or categorizing of software failures occurring during software test, and/or during other procedures. Software failure information is received. The software failure information is parsed to generate a raw matrix of software terms, software failures, and an indication of a number of times each software term was found in each software failure. An importance is determined of each software term of the raw matrix with respect to the software failures of the raw matrix to generate a weighted matrix. A failure space is generated based on the determined importance that indicates each software term-software failure pair of the matrix as a vector. A set of clusters representing the vectors in the failure space is determined. Software failures may be automatically assigned to clusters of the set to be "bucketed" or categorized for ease of subsequent analysis.

20 Claims, 8 Drawing Sheets

(56) References Cited

U.S. PATENT DOCUMENTS

2014/0013307 A1   1/2014   Hansson
2015/0089309 A1*   3/2015   Fu .................... G06F 11/079
                                                      714/57
2016/0196174 A1*   7/2016   Jacob ................ G06F 11/079
                                                      714/37

OTHER PUBLICATIONS

Jones, et al., "Visualization of Test Information to Assist Fault Localization", In Proceedings of the 24th International Conference on Software Engineering, May 19, 2002, 11 pages.
Podgurski, et al., "Automated support for classifying Software Failure Reports", In Proceedings of the 25th International Conference on Software Engineering, May 3, 2003, pp. 465-475.
Francis, et al., "Tree-Based Methods for Classifying Software Failures", In Proceedings of the 15th International Symposium on Software Reliability Engineering, Nov. 2, 2004, 12 pages.
Jones, et al., "Visualization for Fault Localization", In Proceedings of ICSE Workshop on Software Visualization, May 2001, 5 pages.
Liu, et al., "Failure Proximity: A Fault Localization-Based Approach", In Proceedings of the 14th ACM SIGSOFT International Symposium on Foundations of Software Engineering, Nov. 5, 2006, 11 pages.
Jones, James A., "Fault Localization using Visualization of Test Information", In Proceedings of 26th International Conference on Software Engineering, May 23, 2004, 3 pages.
Travison, et al., "Test Instrumentation and Pattern Matching for Automatic Failure Identification", In Proceedings of International Conference on Software Testing, Verification, and Validation, Apr. 9, 2008, pp. 377-386.
Chen, et al., "Visualizing Regression Test Results", Retrieved on: Jun. 1, 2015, Available at: <http://citeseerx.ist.psu.edu/viewdoc/download?doi=10.1.1.366.3623&rep=rep1&Type=pdf>, 10 pages.
Salton, et al., "A Vector Space Model for Automatic Indexing", In Communications of the ACM, vol. 18, Issue 11, Nov. 1, 1975, pp. 613-620.
Lerch, et al., "Finding Duplicates of Your Yet Unwritten Bug Report", In Proceedings of 17th European Conference in Software Maintenance and Reengineering (CSMR), Mar. 5, 2013, pp. 69-78.
"K-means clustering", Retrieved from <<https://en.wikipedia.org/w/index.php?title=Kmeans_clustering&oldid=686350973>>, Nov. 1, 2017, 11 Pages.
"Latent Semantic Analysis", Retrieved from <<https://en.wikipedia.org/w/index.php?title=Latent_semantic_analysis&oldid=687131547>>, Oct. 1, 2017, 5 Pages.
"International Search Report and Written Opinion Issued in PCT Application No. PCT/US2016/057801", Mailed Date: Feb. 2, 2017, 13 Pages.

* cited by examiner

TEST FAILURE BUCKETING

BACKGROUND

A critical quality driver in the software industry is the testing performed on software products. Software testing refers to the action of running a range of test cases against a particular product, each test case exercising a code path on the product. Such testing may find software bugs (errors or other defects) or other undesired attributes of the software product under test. Software testing is performed to improve the quality of software products, and to maintain high software product quality throughout the software development cycle.

A test case being run against a software product may break, referred to as a software test failure. A failure log and/or other data may be generated when a software test fails. The failure log contains information related to the failure. The failure log may be analyzed to determine a reason for the software test failure. Some of the most common reasons for a software test failing include a bug in the software product, a bug in the test case, or an environmental issue. Today, thousands of test cases may be run multiple times a day against a particular software product under development, and the number of test case failures may be in the hundreds, or even greater numbers of failures.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are provided for the "bucketing" or categorizing of software failures occurring during software test. Based on the results of software tests, software failure information is received. The software failure information is parsed to generate a raw matrix of software terms and software failures, and an indication of a number of times each software term was found in each software failure. An importance of each software term of the raw matrix with respect to the software failures of the raw matrix is determined to generate a weighted matrix. A failure space is generated based on the determined importance that indicates each software term-software failure pair of the matrix as a vector. A set of clusters representing the vectors in the failure space is determined. The set of clusters represents failure buckets. The already-seen software failures are automatically assigned to the clusters of the set to be "bucketed" or categorized for ease of subsequent analysis. Subsequent software failures are assigned to an existing bucket when first seen (and later may be taken into account when determining an updated set of cluster representing failure buckets).

Further features and advantages of the invention, as well as the structure and operation of various embodiments, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments of the present application and, together with the description, further serve to explain the principles of the embodiments and to enable a person skilled in the pertinent art to make and use the embodiments.

Figure 1:
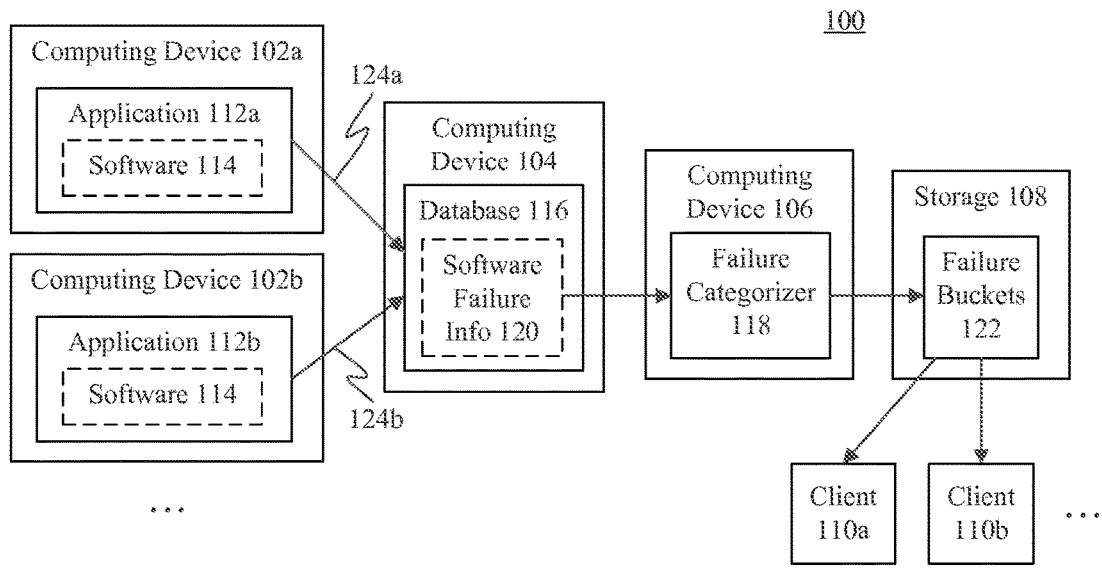
FIG. 1 shows a software failure analysis system configured to group software failures into buckets, according to an example embodiment.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose one or more embodiments that incorporate the features of the present invention. The scope of the present invention is not limited to the disclosed embodiments. The disclosed embodiments merely exemplify the present invention, and modified versions of the disclosed embodiments are also encompassed by the present invention. Embodiments of the present invention are defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments for Bucketing Test Failures

Software testing refers to the action of running a range of test cases against a particular product, each test case exercising a code path on the product. Such testing may find software bugs (errors or other defects) or other undesired attributes of the software product under test. Software testing is performed to improve the quality of software products, and to maintain high software product quality throughout the software development cycle.

When a test case breaks, some of the most common reasons are: a bug in the product, a bug in the test case, or an environmental issue. Today, thousands of test cases may be run multiple times a day against a particular software product under development, with the number of test case failures frequently running in the hundreds or more. As such, analyzing every single failure can be time consuming if not completely unfeasible. One solution to this problem is to designate a team of software engineers as testers (e.g. Software Developer Engineers in Test discipline). This solution can be expensive and typically consumes a large amount of manpower.

Typically, the number of test failures is greater than or equal to the number of actual underlying problems responsible for the failures. With high probability based on empirical observations, many failures are caused by the same root cause problem. This is because test cases tend to share parts of the code paths of the product, common tools, and environmental resources. When something breaks, many test cases sharing the common point of failure in their execution paths are affected.

Accordingly, in embodiments, test failures are grouped into buckets. A set of failure buckets is generated by analyzing a sampling of failures. Each failure bucket corresponds to a particular type of software failure. Software failures may then be assigned to the buckets periodically, as they occur, or according to any other frequency. The buckets compress the amount of possible issues causing such failures into a more manageable number, rather than each software failure having to be analyzed individually. This reduces (or eliminates) the need for a dedicated test team to scan test failures from multiple test passes.

As such, embodiments for test failure bucketing may have one or more of the following benefits:

Reducing test failure investigation work: Previously, a software failure investigator had to investigate a large number of failures. After bucketing, the number of failures to be investigated may be greatly reduced. For instance, in one example, the investigator previously had to analyze 114 failures. After such failures are bucketed into 10 buckets, only 10 issues need to be investigated, which is a ~92% improvement for this particular test pass. The savings in engineering resources are tremendous. If five engineers were used to look at all 114 failures individually, with bucketing, a single engineer might suffice. The cost savings are enormous due to this because engineers can now be allocated to work on developing product features, rather than software test, without sacrificing product quality.

Sorting underlying problems by impact: Failure bucketing naturally sorts underlying issues by the amount of their impact on the quality of a test pass. For instance, if a particular bucket includes 91 of a total of 114 failures, the software failure associated with that particular bucket should be investigated with higher priority to avoid masking other issues. This is because those 91 test cases (a majority of the total test cases) are not running to completion, and hence the related code paths in the product are not being exercised 100%. In the past, one of the challenges of test failure investigation for an engineer had been identifying what failure to investigate first as to maximize the benefit of the time spent on the investigation and the fix. Engineers had to look for failures that shared a common fix as to improve the test pass rate the most. Failure bucketing naturally solves this problem.

Identifying solutions for new failures based on similar past failures: A feature of failure bucketing is that past test failures may be made available for analysis and comparison against new test failures. If there is already an incident tracking the older failures (e.g., in failure metadata there may be a link to such a tracking item), when a new failure occurs that is very similar to such previous failure, such incident can be reopened in an automated fashion to track the new failure, rather than opening a brand new incident without a history of the work done on such issue by engineers in the past. In this manner, investigation notes compiled by engineer(s) from the past failures automatically help with analyzing new failures. This feature may be implemented as an "Automatic Incident Creation" system, where new failures that do not appear similar to past failures are tracked with a new incident identifier automatically, while failures that appear similar to past failures are tracked under a same identifier already in use. As such, when a failure first occurs in a test pass, the failure is automatically tracked as a new incident. Repeated failures coming from the same test case may be add to the count of occurrences of such incident. Hence, the visibility over what has failed 'new' in a test pass is achieved. With test passes running multiple (e.g., 4) times a day, gaining visibility as to what 'new' issues are arising in every test pass is a very helpful feature.

Enabling more rapid discovery of environmental issues in a test pass: Discovering an issue affecting a test pass to be widespread is easy to identify with failure bucketing. Such an issue may cause many or even most tests to fail for the same reason. For example, a storage outage may cause storage account creations to fail, which can result in similar failure logs, which can be grouped into one large bucket of failures. Early detection may be useful to time fast mitigation and save engineering investigation time. Also, this analysis may be used to tag environment issues as being associated with a particular failure bucket, so that in the feature test passes can be labeled as "valid" or "invalid" whether environmental issues affected it or not.

Enabling cross test pass failure bucketing: Failure bucketing can occur not only within one test pass, but also across multiple test passes. When multiple test passes are run in batches multiple times a day, and there is a lack of engineering resources to analyze every test pass, failure bucketing can group issues across test passes so that only a few distinct issues have to be addressed from all test passes, rather than separately having to analyze the failures of each test pass batch. This ensures that test pass results do not go unprocessed due to lack of engineering resources, which in turn allows for higher bug detection and less investigation time.

Enabling failure tagging/tracking: When a failure or failure bucket is investigated and a fix is pending, a user can tag such issue from "active" to "pending." In this manner, future test passes that reflect the same issue can determine that the issue is already being looked into and does not need further investigation. In the past, engineers had to dig into each failure time and time again and then recall that they had already encountered the issue and a fix was pending. This is where much of the time is spent for recurring issues that take time to fix. Failure tagging allows engineers to focus on what's new and discard issues already looked into that are pending fixes.

Avoiding the need for constant maintenance: Prior solutions for categorizing software failures use a text match approach, defining the signatures of different issues/causes, and looking for the signatures in test case output (e.g., error messages). A large number of different error codes is sometimes injected into source code, and if the same error code is seen in two failed test cases, the two test cases may be assumed likely to share the same root cause. A common problem in such an approach is that constant maintenance is required of the signature definitions, the error code instrumentation, etc. In contrast, test failure bucketing described herein is very low maintenance. For example, signatures do not have to be changed as code changes. Instead, embodiments are self-adaptive. Furthermore, embodiments work well for existing code bases (e.g., products that have been developed for 5 years). Embodiments do not require the performance of back-filling work for the existing code base. As such, the adoption cost is lower.

Embodiments may be implemented in various ways. For instance, FIG. 1 shows a software failure analysis system 100 configured to group software failures into buckets, according to an example embodiment. As shown in FIG. 1, system 100 includes computing devices 102a and 102b, a computing device 104, a computing device 106. storage 108, and clients 110a and 110b. Computing device 102a includes an application 112a, and computing device 102b includes an application 112b. Computing device 104 includes a database 116, which stores software failure information 120. Computing device 106 includes a failure categorizer 118. Storage 108 stores failure buckets 122.

Computing devices 102a, 102b, 104, and 106, clients 110a and 110b may each be any type of stationary or mobile electronic device, including a mobile computer or mobile computing device (e.g., a Microsoft® Surface® device, a laptop computer, a notebook computer, a tablet computer such as an Apple iPad™, a netbook), a stationary computing device such as a desktop computer or PC (personal computer), a server, or other type of electronic device.

Figure 2:
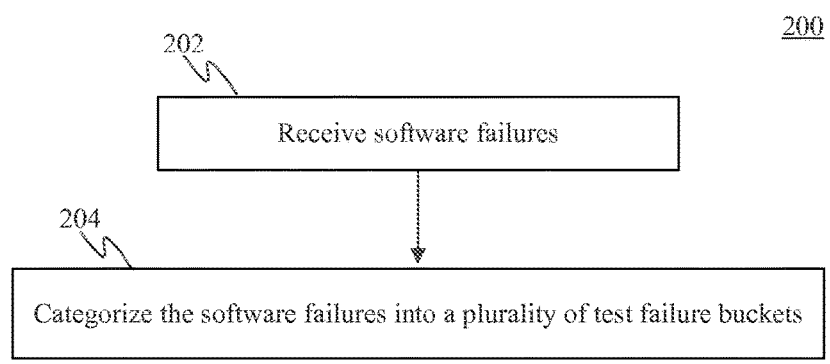
FIG. 2 shows a flowchart providing a process for categorizing software failures into buckets, according to an example embodiment.

In embodiments, software failure analysis system 100 may operate according to FIG. 2. FIG. 2 shows a flowchart 200 providing a process for categorizing software failures into buckets, according to an example embodiment. Software failure analysis system 100 is described as follows with reference to flowchart 200.

Flowchart 200 of FIG. 2 begins with step 202. In step 202, software failures are received. With reference to FIG. 1, computing devices 102a and 102b are used for software test. In particular, application 112a of computing device 102a and application 112b of computing device 102b are applications (same or different) configured for testing of software 114. For instance, applications 112a and 112b may be software development applications (e.g., Xcode® developed by Apple Corporation of Cupertino, Calif., Microsoft® Visual Studio®, developed by Microsoft Corporation of Redmond, Wash.) or other type of applications for software test. Accordingly, applications 112a and 112b can run test cases on software 114 to generate software failures 124a and 124b, respectively. Software failures 124a and 124b each include software failure information for one or more software failures encountered in running test cases on software 114. Such software failure information may include one or more failure logs that each include test failure output information (e.g. log messages, stack traces, etc.). At any time(s), including randomly, periodically, etc., failure categorizer 118 may access database 116 for software failure information 120.

Although two computing devices 102a and 102b running test applications that generate software failure information are shown in FIG. 1, any number of such computing devices may be present, including numbers in the tens, hundreds, or greater numbers. Software failures 124a and 124b (and any further generated software failures) are stored in database 116 maintained by computing device 104 as software failure information 120.

In step 204 of flowchart 200, the software failures are categorized into a plurality of test failure buckets. Failure categorizer 118 receives and processes software failure information 120 to generate failure buckets that categorize software failure information 120. Each generated failure bucket corresponds to a particular type of software failure. Failure categorizer 118 may subsequently sort received software failures of software failure information 120 into the various designated failure buckets.

As shown in FIG. 1, the generated failure buckets are stored in storage 108 as failure buckets 122. The software failures categorized into each failure bucket 122 may be stored in failure buckets 122 in storage 108. Subsequently, clients 110a, 110b, etc., may access and analyze the software failures categorized in failure buckets 122 in any manner.

In embodiments, flowchart 200 may be performed in various ways, and failure categorizer 118 of FIG. 1 may be configured in various ways to group software failures into failure buckets. Example embodiments for generating failure buckets for organizing software failures are described in the next subsection, followed by example embodiments for assigning received software failures into the failure buckets described in the subsequent subsection.

A. Example Embodiments for Generating Failure Buckets

Figure 3:
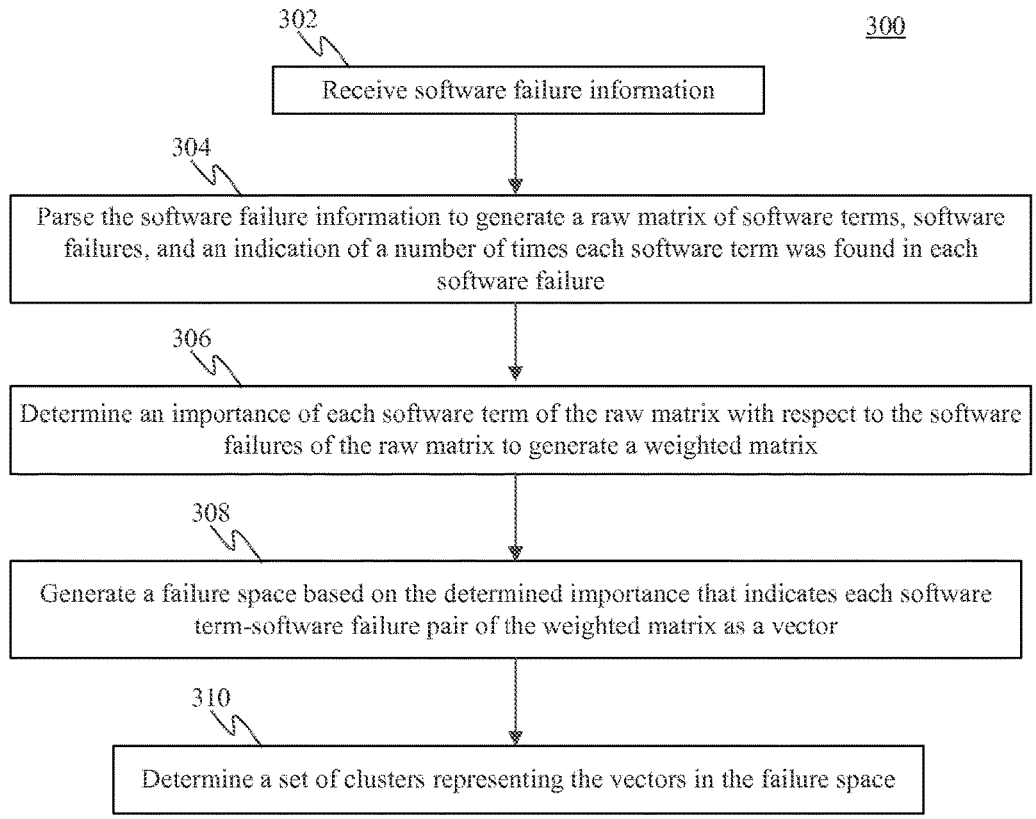
FIG. 3 shows a flowchart providing a process for categorizing software failures into clusters that represent failure buckets, according to an example embodiment.
Figure 4:
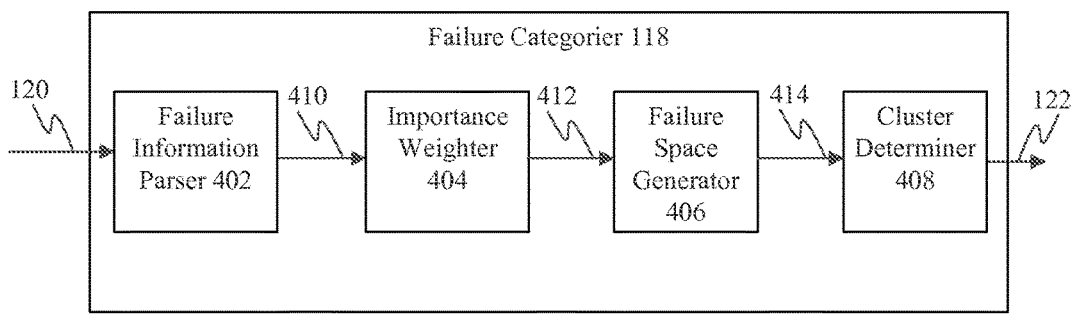
FIG. 4 shows a block diagram of a failure categorizer configured to generate buckets for grouping software failures, according to an example embodiment.

In embodiments, flowchart 200 may be performed in various ways, and failure categorizer 118 of FIG. 1 may be configured in various ways to group software failures into failure buckets. For instance, FIG. 3 shows a flowchart 300 providing a process for categorizing software failures into clusters that represent failure buckets, according to an example embodiment. Flowchart 300 is described as follows with respect to FIG. 4. FIG. 4 shows a block diagram of failure categorizer 118, according to an example embodiment. In FIG. 4, failure categorizer 118 is configured to generate buckets for grouping software failures. As shown in FIG. 4, failure categorizer 118 includes a failure information parser 402, an importance weighter 404, a failure space generator 406, and a cluster determiner 408. Flowchart 300 of FIG. 3 and failure categorizer 118 of FIG. 4 are described as follows.

Flowchart 300 begins with step 302. In step 302, software failure information is received. As described above with respect to FIG. 1, failure categorizer 118 may access database 116 for software failure information 120, which includes information regarding software failures. As shown in FIG. 4, failure information parser 402 of failure categorizer 118 receives software failure information 120.

In step 304, the software failure information is parsed to generate a raw matrix of software terms, software failures, and an indication of a number of times each software term was found in each software failure. In an embodiment, failure information parser 402 is configured to parse software failure information 120, which may be in raw form (e.g., raw test failure logs), for ease of subsequent processing. For instance, failure information parser 402 may clean the data of software failure information 120, perform modeling on the data, and/or perform other processing. As shown in FIG. 4, as a result of the parsing, failure information parser 402 generates a raw matrix 410. Raw matrix 410 is a matrix of software terms, software failures, and an indication of a number of times each software term was found in each software failure.

Figure 5:
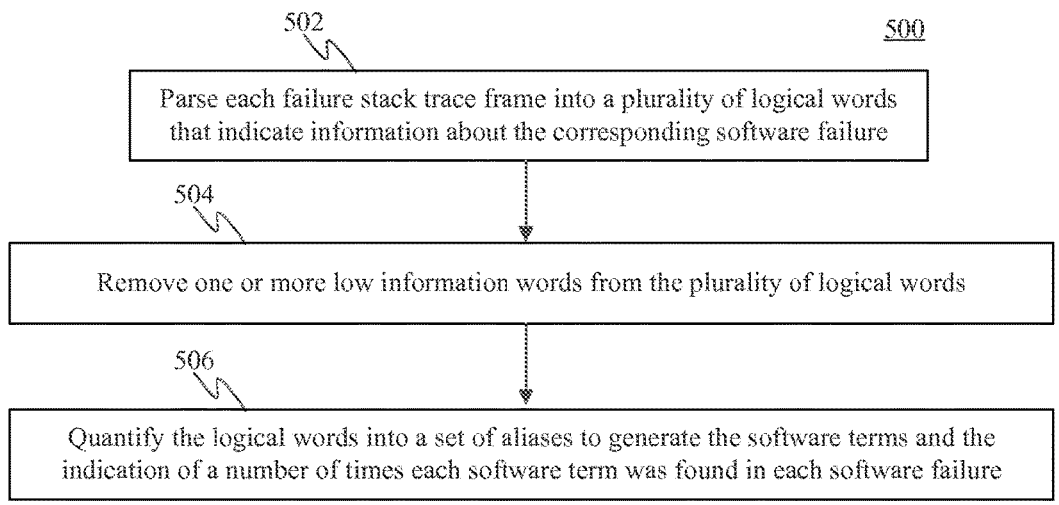
FIG. 5 shows a flowchart providing a process for parsing software failures, according to an example embodiment.
Figure 6:
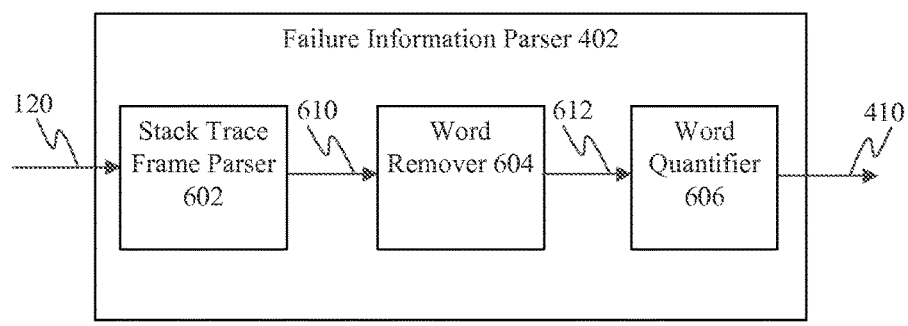
FIG. 6 shows a block diagram of a failure information parser, according to an example embodiment.

Failure information parser 402 may perform this parsing in any manner. For instance, FIG. 5 shows a flowchart 500 providing a process for parsing software failures, according to an example embodiment. In an embodiment, failure information parser 402 may operate according to flowchart 500. Furthermore, failure information parser 402 may be configured in any suitable manner to perform flowchart 500. For example, FIG. 6 shows a block diagram of failure information parser 402, according to an embodiment. As shown in FIG. 6, failure information parser 402 includes a stack trace frame parser 602, a word remover 604, and a word quantifier 606. Any one or more of these features of failure information parser 402 may be present, depending on the particular parsing-related operations to be performed. Flowchart 500 is described as follows with respect to failure information parser 402 of FIG. 6.

Flowchart 500 begins with step 502. In step 502, each failure stack trace frame is parsed into a plurality of logical words that indicate information about the corresponding software failure. A stack trace is a report of the active stack frames (data structures containing subroutine state information) at a certain point in time during the execution of a program. In an embodiment, stack trace frame parser 602 receives software failure information 120, and is configured to parse the information therein (e.g., stack traces, failure logs), breaking down lines of code contained within each stack trace frame into words or logical word compositions. For example, when parsing stack traces, each failure stack trace frame may be parsed in such a way that retains the origin of the frame as a logical word. As shown in FIG. 5, stack trace frame parser 602 generates software failure logical words 610, which includes a set of logical words (terms) for each software failure.

An example portion of a raw test failure log is shown below as an example of a software failure, which includes a mixture of log messages and stack traces:

---

IsTrue - [1/13/2015 9:25:40 PM][4620][34]Verifying Instance View VM Provisioning State ProvisioningState/failed/Containers ...
WEX.TestExecution.VerifyFailureException: IsTrue - [1/13/2015 9:25:40 PM][4620][34]Verifying Instance View VM Provisioning ...
at WEX.TestExecution.Verify.VerificationFailed(String userMessage, String verifyMessage)
at
Microsoft.Azure.CRP.Text.Proxies.CrpTestDataContract.
VMPropertiesWrapper.
ValidateProvisioningState(VMValidationContexts ...
...
at
Microsoft.Azure.CRP.Test.Proxies.CrpApis.ResourceOperation-WorkFlow`7.d_9.
MoveNext( ) in x:\bt\339441\private\Services\...
- - - End of stack trace from previous location where exception was thrown
- - -

---

In an embodiment, the following line from the above failure log:

--- at WEX.TestExecution.Verify.VerificationFailed(String userMessage, String verifyMessage)

--- may be parsed by stack trace frame parser 602 into the following logical words:

--- at
WEX.TestExecution.Verify.VerificationFailed
String
userMessage
String
verifyMessage

---

As such, stack trace frame parser 602 parses each software failure into logical words that contain the most relevant information about the software failure (e.g., failure name, where the failure occurred, what operations/methods/variables were involved). For instance, the following frame:

WEX.TestExecution.Verify.VerificationFailed contains more information than the sum of its parts 'WEX'+ 'TestExecution'+etc. as a "bag of words", because the frame is connected and has a sense of direction. Frame A.B=! frame B.A, and if we were to separate both of those frames, then failures containing both A and B both would be identical even though they are not. As such, the parsed words for a software failure are maintained in association with each other by stack trace frame parser 602.

As mentioned above, function names may be maintained as logical words, but function parameters are broken further down. A reason for not keeping a full function signature is that function overloads with more parameters functionality-wise are not too distinct from the core logic involving a function. Hence functions with different parameters (i.e., overloads) are treated during parsing as having the same function name (same origin), but the parameter counts differ, which may or may not make a difference later in the process. A point is that function names (full frame, such as A.B.C) are considered as having more importance than the full function signature having the parameters included. For example, A.B.C(p1,p2) is not much different at their core than A.B.C (p1,p2,p3,p4). Hence, both frames may be parsed as A.B.C, and their parameters become logical words on their own.

Referring back to FIG. 5, in step 504, one or more low information words are removed from the plurality of logical words. In an embodiment, word remover 604 receives software failure logical words 610, and is configured to remove one or more low information-yielding words therefrom. Low information-yielding words are those that provide relatively little or no information about why a particular software failure occurred. Example of such words include "at" in the stack trace frame. Such words are eliminated by word remover 604 because they may strain computations and bloat matrices. As shown in FIG. 5, word remover 604 generates reduced logical word set 612, which includes a reduced set of local words for one or more software failures.

In step 506, the logical words are quantified into a set of aliases to generate the software terms and the indication of a number of times each software term was found in each software failure. In an embodiment, word quantifier 606 receives reduced logical word set 612, and is configured to perform one or more of word recognition, extraction, and/or quantification. Word quantifier 606 is configured to quantify (count occurrences of) the logical words, in some cases, transform the local words into common aliases. For example, all guid (globally unique identifier) words (which are unique by nature) may be quantified under a single common alias 'word-guid' because the information of such words is not in the actual word text (because it is a guid). Rather, the relevant information results from the fact that guids were present. For example, three guids appearing in a test case output may be quantified into a word-guid alias having a count of 3. A similar technique may be applied to IP-Addresses, for example.

As shown in FIG. 5, word quantifier 606 generates raw matrix 410, which is a matrix of software terms, software failures, and an indication of a number of times each software term was found in each software failure. Raw matrix 410 may have any suitable form, including being an n by m matrix Draw, where each row represents a word, each column a test failure, and an entry Draw(i,j) signifies the number of times word_i was found in failure_j.

An example of raw matrix 410 is shown below as Table 1, with each row corresponding to a particular logical word w, and each column corresponding to a particular software failure f:

TABLE 1

|   | f0  | f1 | ... | fm-1 | fm |
|---|-----|----|----|------|-----|
| w0 | 123 | 3 | ... | 4 | 0 |
| w1 | 3 | 0 | ... | 43 | 0 |
| ... | 7 | 0 | ... | 40 | 0 |
| wn-1 | 0 | 0 | ... | 0 | 0 |
| wn | 120 | 4 | ... | 6 | 0 |

The raw matrix Draw represented by Table 1 contains counts for all parsed logical words w0 to wn for all software failures f0 to fm. For example, Table 1 indicates how many times word w0 was found (123 times) in software failure f0.

Referring back to flowchart 300 of FIG. 3, in step 306, an importance of each software term of the raw matrix is determined with respect to every other term as well as the software failures of the raw matrix to generate a weighted matrix. In an embodiment, importance weighter 404 of FIG. 4 is configured to determine an importance for each software term (logical word) of raw matrix 410 relative to other software terms of raw matrix 410. Importance weighter 404 may perform any suitable importance weighting algorithm, proprietary or known to persons skilled in the relevant art(s). An example of such a weighting algorithm is TF-IDF (term frequency and inverse document frequency). As shown in FIG. 4, importance weighter 404 receives raw matrix 410. Importance weighter 404 determines an importance weight for each software term in raw matrix 410, and generates weighted matrix 412, which includes the weighted software terms.

Figure 7:
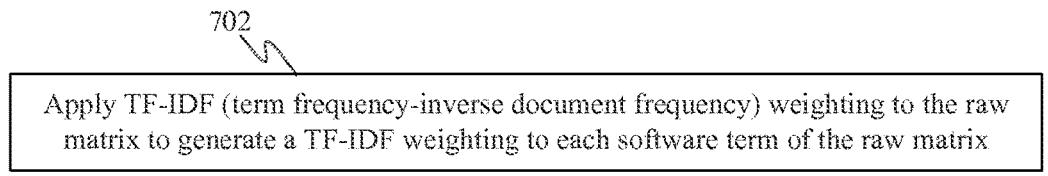
FIG. 7 shows a process for weighting terms found in software failures, according to an example embodiment.
Figure 8:
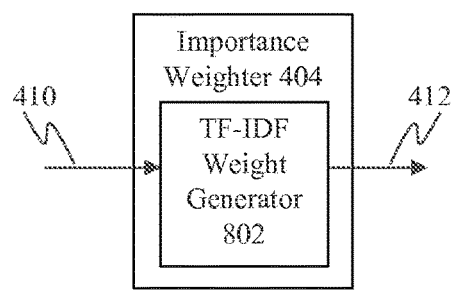
FIG. 8 shows a block diagram of an importance weighter, according to an example embodiment.

Importance weighter 404 may perform this weighting in any manner. For instance, FIG. 7 shows a step 702 for weighting terms found in software failures, according to an example embodiment. In an embodiment, importance weighter 404 may operate according to step 702. Importance weighter 404 may be configured in any suitable manner to perform step 702. For example, FIG. 8 shows a block diagram of importance weighter 404, according to an example embodiment. As shown in FIG. 8, importance weighter 404 includes a TF-IDF weight generator 802. Step 702 is described as follows with respect to importance weighter 404 of FIG. 8.

In step 702, TF-IDF weighting is applied to the raw matrix to generate a TF-IDF weighting to each software term of the raw matrix. In an embodiment, TF-IDF weight generator 802 is configured to generate an importance weight for each software term in raw matrix 410 to generate weighted matrix 412, indicating an importance of each software term in the failure corpus.

In particular, raw matrix 410 (Draw), having i rows (software terms) and j columns (software failures), stores a count value/term frequency for each row/column cell, defined as:

$$\text{Draw}(i,j) = TF = \text{Term Frequency}$$

TF-IDF weight generator 802 is configured to perform the TF-IDF weighting by applying Equation 1 below to generate each entry of the weighted matrix from the raw matrix (multiplying the cell TF by a calculated log value):

$$Dw(i, j) = \text{Draw}(i, j) * \log_{10} \frac{N}{DF} \qquad \text{Equation 1}$$

Where:
Dw(ij)=data weighted (after a weighting algorithm is applied to Draw(i,j));

N=the number of failures (e.g., number of columns m in Draw); and

DF=the number of failures that word wi appears in.

Accordingly, TF-IDF weight generator 802 generates a weighted matrix 412, in this example matrix Dw, which has the same dimensions as Draw, but whose entries Dw(i,j) are weighted to reflect word importance.

Referring back to flowchart 300 of FIG. 3, in step 308, a failure space is generated based on the determined importance that indicates each software term-software failure pair of the weighted matrix as a vector. In an embodiment, failure space generator 406 of FIG. 4 is configured to determine a failure space that indicates each software term-software failure pair of weighted matrix 412 as a vector. Failure space generator 406 may generate the failure space according to any suitable algorithm, proprietary or known to persons skilled in the relevant art(s). An example of such an algorithm is LSA (latent semantic analysis). As shown in FIG. 4, failure space generator 406 receives weighted matrix 412. Failure space generator 406 determines a vector for each software term-software failure in weighted matrix 412, and generates a failure space 414, which includes the vectors.

Figure 9:
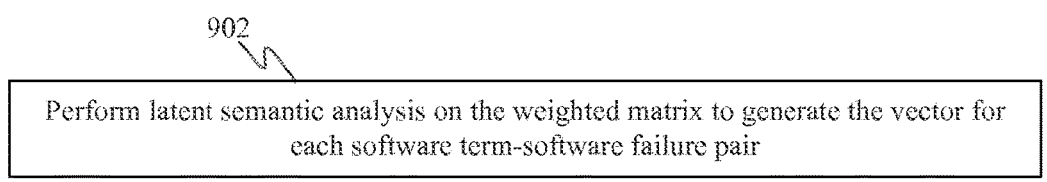
FIG. 9 shows a process for generating a failure space, according to an example embodiment.
Figure 10:
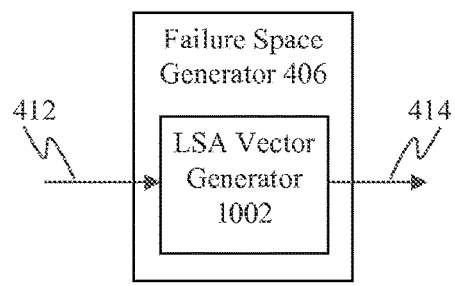
FIG. 10 shows a block diagram of a failure space generator, according to an example embodiment.

Failure space generator 406 may generate the vectors/failure space in any manner. For instance, FIG. 9 shows a step 902 for generating a failure space, according to an example embodiment. In an embodiment, failure space generator 406 may operate according to step 902. Failure space generator 406 may be configured in any suitable manner to perform step 902. For example, FIG. 10 shows a block diagram of failure space generator 406, according to an example embodiment. As shown in FIG. 10, failure space generator 406 includes an LSA vector generator 1002. Step 902 is described as follows with respect to failure space generator 406 of FIG. 10.

In step 902, latent semantic analysis is performed on the weighted matrix to generate the vector for each software term-software failure pair. In an embodiment, LSA vector generator 1002 is configured to generate the vector for each software term-software failure pair based on weighted matrix 412 using LSA. By running LSA on weighted matrix 412, a vector projection is created for each logical word and software failure, which in conjunction may be referred to as a failure space (failure space 414), where each logical word and software failure reside in the failure space as a high dimensional vector.

Figure 11:
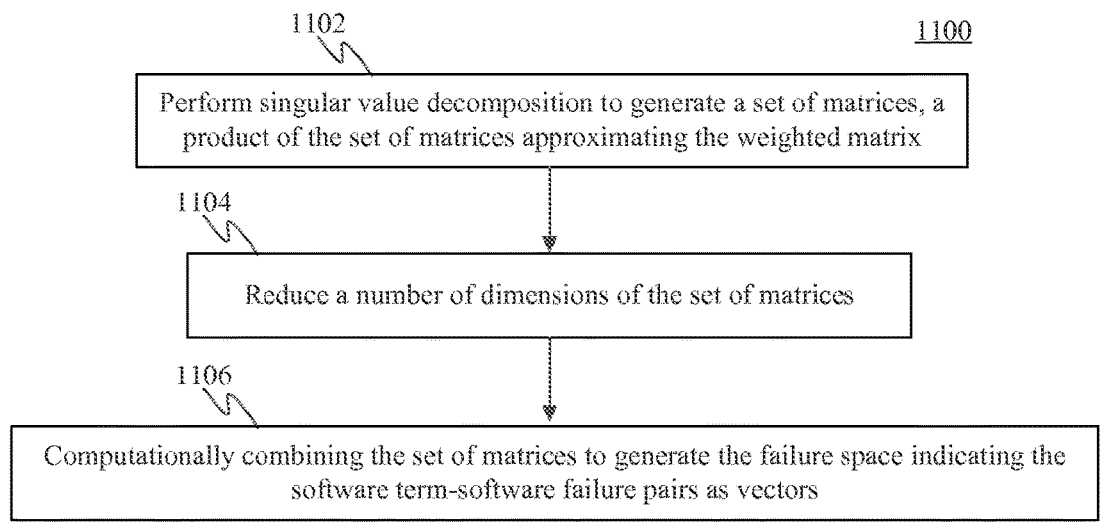
FIG. 11 shows a flowchart providing a process for creating vectors from software failures for inclusion in a failure space, according to an example embodiment.
Figure 12:
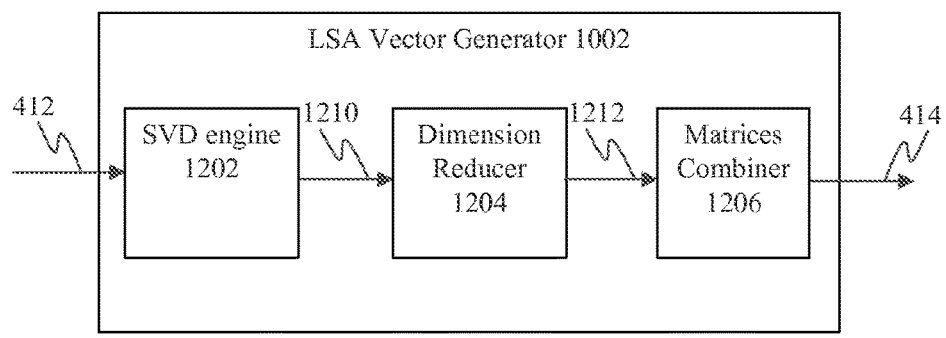
FIG. 12 shows a block diagram of a vector generator, according to an example embodiment.

For instance, FIG. 11 shows a flowchart 1100 providing a process for creating vectors from software failures for inclusion in a failure space, according to an example embodiment. In an embodiment, LSA vector generator 1002 may operate according to flowchart 1100. FIG. 12 shows a block diagram of LSA vector generator 1002, according to an example embodiment. In an embodiment, LSA vector generator 1002 may be configured according to FIG. 12. As shown in FIG. 12, LSA vector generator 1002 includes an SVD (singular value decomposition) engine 1202, a dimension reducer 1204, and a matrices combiner 1206. Flowchart 1100 is described as follows with respect to LSA vector generator 1002 of FIG. 12.

Flowchart 1100 begins with step 1102. In step 1102, singular value decomposition is performed to generate a set of matrices, such that a product of the set of matrices approximates the weighted matrix. As shown in FIG. 12, SVD engine 1202 receives weighted matrix 412. SVD engine 1202 runs SVD on weighted matrix 412 to generate a set of matrices 1210, that when multiplied together approximate weighted matrix 412 (F), as indicated by Equation 2 below:

$$Dw = WSF^T \qquad \text{Equation 2}$$

Where:
W=a row matrix, where each row represents a logical word vector in high dimension;
S=a m×n diagonal matrix with non-negative real numbers on the diagonal;
$F^T$=a column matrix, where each column represents a software failure in high dimension.

In linear algebra, singular value decomposition (SVD) is a factorization of a real or complex matrix. Techniques for SVD will be known to persons skilled in the relevant art(s).

In step 1104, a number of dimensions of the set of matrices is reduced. As shown in FIG. 12, dimension reducer 1204 receives set of matrices 1210. Set of matrices 1210 includes matrices W, S, and $F^T$ described above. Dimension reducer 1204 is configured to remove one or more dimensions from set of matrices 1210 to generate a dimension reduced set of matrices 1212.

In an embodiment, dimension reducer 1204 reduces the number of dimensions of the resulting $WSF^T$ matrices to a predetermined number of dimensions, such as about 200 dimensions, depending on the singular values distribution of matrix S. This means that the top k highest singular values are retained from the diagonal-sorted matrix S, and correspondingly, the first k columns of matrix W and the first k rows of matrix $F^T$ are retained.

Hence Dw may be approximated by the reduced matrices as shown in Equation 3 below:

$$DW_k = W_k S_k F_k^T \qquad \text{Equation 3}$$

In step 1106, the set of matrices is computationally combined to generate the failure space indicating the software term-software failure pairs as vectors. As shown in FIG. 12, matrices combiner 1206 receives dimension reduced set of matrices 1212. Dimension reduced set of matrices 1212 includes matrices $W_k$, $S_k$, and $F_k^T$ described above. Matrices combiner 1206 is configured to computationally combine the matrices of dimension reduced set of matrices 1212 to generate failure space 414.

For example, in an embodiment, matrices combiner 1206 is configured to right multiply $S_k$ into $W_k$ and left multiply $S_k$ into $F_k$ to generate the final matrices:

$$F_k = (WS)_k (SF^T)_k \qquad \text{Equation 4}$$

Let $W_k' = (WS)_k$ and $F_k' = (SF^T)_k$

Where:
$W_k'$ rows represent the final word vectors in a k dimensional space, and
$F_k'$ columns represent failure vectors in a k dimensional space.

Accordingly, failure space 414 includes row matrix $W_k'$, whose rows represent words in a k dimensional failure space, and column matrix $F_k'$, whose columns represent failures in a k dimensional failure space.

Referring back to flowchart 300 of FIG. 3, in step 310, a set of clusters representing the vectors in the failure space is determined. In an embodiment, cluster determiner 408 of FIG. 4 is configured to perform failure clustering on the high dimensional failure vectors of failure space 414. Cluster determiner 408 may generate the failure space according to any suitable algorithm, proprietary or known to persons skilled in the relevant art(s). An example of such an algorithm is a K-means clustering algorithm. As shown in FIG. 4, cluster determiner 408 receives failure space 414. Cluster determiner 408 determines a set of clusters comprising the vectors in failure space 414, and generates failure buckets 122, with each failure bucket of failure buckets corresponding to a cluster of the determined set of clusters.

Figure 13:
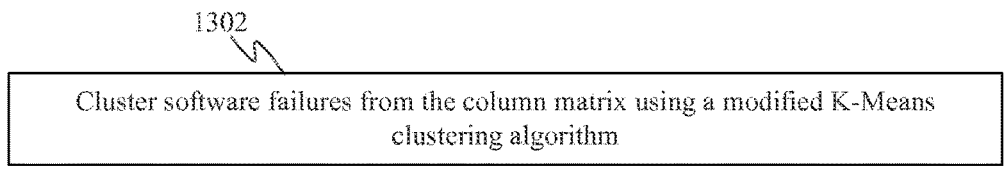
FIG. 13 shows a process for generating software failure clusters, according to an example embodiment.
Figure 14:
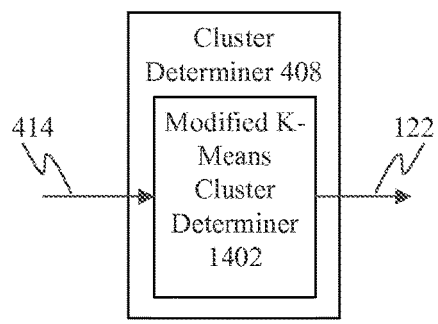
FIG. 14 shows a block diagram of a cluster determiner, according to an example embodiment.

Cluster determiner 408 may generate the failure buckets based on failure space 414 in any manner. For instance, FIG. 13 shows a step 1302 for generating software failure clusters, according to an example embodiment. In an embodiment, cluster determiner 408 may operate according to step 1302. Cluster determiner 408 may be configured in any suitable manner to perform step 1302. For example, FIG. 14 shows a block diagram of cluster determiner 408, according to an example embodiment. As shown in FIG. 14, cluster determiner 408 includes a modified K-means cluster determiner 1402. Step 1302 is described as follows with respect to cluster determiner 408 of FIG. 14.

In step 1302, software failures from the column matrix are clustered using a modified K-Means clustering algorithm. In an embodiment, modified K-means cluster determiner 1402 is configured to generate the failure buckets based on failure space 414 using a modified K-means clustering algorithm. The failure buckets are generated by modified K-means cluster determiner 1402 by clustering failures from column matrix $F_k'$ of failure space 414.

The "K-means algorithm" is a well-known technique to find clusters in a high dimensional space. K-means clustering aims to partition n observations into k clusters in which each observation belongs to the nearest cluster. This results in a partitioning of the data space into Voronoi cells. Given a set of observations (x1, x2, . . . , xn), where each observation is a d-dimensional real vector, k-means clustering aims to partition the n observations into k (≤n) sets S={S1, S2, . . . , Sk} so as to minimize the within-cluster sum of squares (WCSS). In other words, its objective is to find:

$$\arg\min_S \sum_{i=1}^{k} \sum_{x \in S_i} \| x - \mu_i \|^2 \quad \text{Equation 5}$$

Where:

$\mu_i$=the mean of points in $S_i$.

One issue with the K-means algorithm is that the algorithm is initialized with a particular number of clusters k, but finding the right number k is challenging because at the start of the algorithm, it is not known how many clusters there are. According to embodiments, to solve this problem, modified K-means cluster determiner 1402 may implement a modified K-means clustering algorithm that uses a technique referred to herein as "edge detection."

Another issue is that overestimating k (passing in large k) does not allow the K-means algorithm to finish in a reasonable time, and hence the computations may take more time than is feasible for the overestimate. According to embodiments, to solve this problem, modified K-means cluster determiner 1402 may implement a modified K-means clustering algorithm that uses a technique referred to herein as the "cluster cooling chamber."

Failure buckets 122 includes the resulting set of clustered failures. Failure buckets 122 includes clusters, with each cluster being formed by failure vectors. Each failure cluster is referred to herein as a failure bucket.

Accordingly, an embodiment, modified K-means cluster determiner 1402 may implement the following modified K-means clustering algorithm, shown below in the form of pseudocode:

```
clusters = Edge Detection (F_k')
while (averageFailureDistance < P1)
    clusters = K-Means-CCC (clusters)
``` averageFailureDistance = Average distance from each cluster in clusters (cluster[i]) to the failures contained within each cluster (clusters[i].Failures).

Where:

P1=a parameter that is adjustable for fine-tuning (e.g., a value of 0.5).

"K-Means-CCC" referenced in the above algorithm a modified K-Means algorithm that uses the CCC (cluster cooling chamber) technique (further described below). At each iteration of the last two operations (as constrained by the "while" constraint above), the amount of clusters may be reduced by one or more clusters, and the average failure distance to clusters is used as the converging metric. The algorithm generates failure buckets 122, which are equal to failure clusters C (for clusters), each containing a portion of the failure vectors in matrix $F_k'$.

Figure 15:
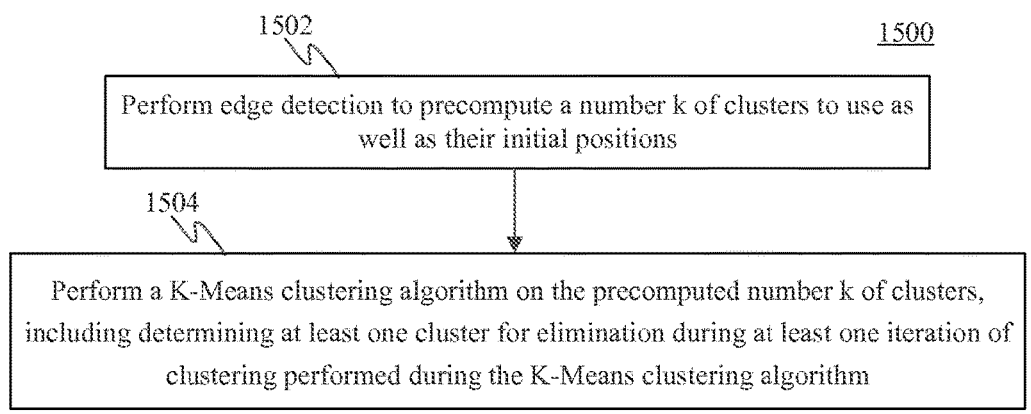
FIG. 15 shows a flowchart providing a process for modified K-Means clustering, according to an example embodiment.

For instance, FIG. 15 shows a flowchart 1500 providing a process for modified K-Means clustering, according to an example embodiment. In an embodiment, modified K-means cluster determiner 1402 may operate according to flowchart 1500. Flowchart 1500 is described as follows with respect to modified K-means cluster determiner 1402 of FIG. 14.

Flowchart 1500 begins with step 1502. In step 1502, edge detection is performed to precompute a number k of clusters to use as well as their initial positions. In an embodiment, modified K-means cluster determiner 1402 may include an edge detector that implements edge detection of any suitable type. Edge detection enables the number of clusters k to be used in the main K-means clustering algorithm to be precomputed. Normally, edge detection returns a large number of clusters, which serve as an ideal maximum count. Edge detection identifies a useable maximum number of clusters because failures tend to repeat themselves over a time span, and many small groups of identical failures occur. Edge detection detects all of those small groups of similar failures, which is much larger than the ideal number of buckets desired to be determined, because larger buckets that contain many subgroups of related identical bucket failures are desired to be determined as to generalize the data and avoid overfitting. Buckets of related failures are desired to be identified, rather than buckets of closely similar failures. However, starting with many buckets of identical failures provides a reasonable upper bound k to the general K-means clustering algorithm. As such, a user does not have to come up with a reasonable parameter k. Instead, edge detection is implemented by modified K-means cluster determiner 1402 to determine the parameter k. Furthermore, edge detection naturally outputs a starting location for all k clusters, which helps greatly because random initialization of the clusters need not be performed at the next step.

In an embodiment, the edge detector of modified K-means cluster determiner 1402 may perform the following edge detection algorithm:

(1) Pick random non-zero row r in $F_k'$;

(2) Compute distance from r to every other row in $F_k'$. Let vector d contain all such distances;

(3) Sort vector d and the respective rows in $F_k'$ with respect to distance d in increasing order. Let d_sorted and $F_k'$_sorted contain such info respectively;

(4) Run boundary detection algorithm on vector d_sorted
   a. Compute deltas of vector d_sorted entries and store in d_deltas
      i. d_delta[i]=d_sorted[i+1]−d_sorted[i]
   b. leftBoundaries=DetectDeltaBoundaries(d_delta)
   c. rightBoundaries=DetectDeltaBoundaries (d_delta.Reverse)
   d. boundaries=leftBoundaries+rightBoundaries
   e. Sort boundaries in increasing order
(5) Initialize cluster centroids—one cluster centroid per failure range within boundaries of $F_k'$_sorted
   a. ClusterCentroids[c]=ComputeCentroid ($F_k'$_sorted [boundaries[i]: boundaries[i+1]])

An example embodiment of the DetectDeltaBoundaries ( )algorithm is shown as follows:

```
DetectDeltaBoundaries(deltas)
    i = 0
    delta_sum = deltas[i]
    boundaries = [ ]
    for (j = i + 1; j < deltas.Length; j++)
        avg_delta = delta_sum/(j − i)
        if (deltas[j] > P2 * avg_delta)
            boundaries.add(j)
            delta_sum = deltas[j]
            i = j
        else
            delta_sum += deltas[j]
    return boundaries
```

Where:
   P2=a parameter that is adjustable for fine-tuning (e.g., a value of 1.5).

This example edge detection algorithm generates an output of the ClusterCentroids vector, which contains a reasonable maximum number of clusters centroids.

In step 1504, a K-Means clustering algorithm is performed on the precomputed number k of clusters, including determining at least one cluster for elimination during at least one iteration of clustering performed during the K-Means clustering algorithm. In an embodiment, modified K-means cluster determiner 1402 is configured to perform the K-means clustering algorithm, known to persons skilled in the relevant art(s), based on the precomputed value for parameter k. Modified K-means cluster determiner 1402 uses cluster cooling chamber logic to allow the main K-means clustering algorithm to handle a large number of clusters while still computing in a reasonable time, with the cluster cooling chamber logic configured to throw away clusters that are not grabbing any data after multiple re-initialization attempts.

During the typical K-means clustering algorithm, after all data has been assigned to nearest clusters, some clusters may not contain any data. At this point, the K-means clustering algorithm re-initializes such data-empty clusters randomly in the space. This re-initialization becomes a problem when one is overestimating the number of clusters since such many clusters keep bouncing around the space while they get re-initialized, which prevents the algorithm from converging and ever finishing.

In embodiments, it is desirable to find as many clusters as possible in our failure space, as this provides more granular failure buckets, which is desirable at least for the reason that it is preferable to have extra buckets of failures versus having failures being misplaced in the wrong bucket. For example, in the case of one large bucket versus three smaller buckets, the three smaller buckets may be preferable even at the risk of the three smaller buckets being actually one bucket, so long as we reduce the probability that three smaller buckets that are actually different are actually clumped into one bucket. Hence, it may be desirable to overestimate the number of buckets k in the K-Means Clustering algorithm, which brings up the issue of the algorithm not converging in reasonable time.

In an embodiment, modified K-means cluster determiner 1402 performs the cluster cooling chamber modification as follows. Each cluster has a temperature, which is a number that starts at 0 (hot) and increases linearly (in its simplest form) (cools down) every time such cluster gets re-initialized. Each cluster also has a set temperature threshold limit that it can cool down to, at which point the cluster is taken out of the available clusters set. Such threshold may be chosen in any manner, including being chosen randomly within a range (e.g. [5, 50]). A reason to choose this threshold for each cluster randomly within a range is so that the cooling process occurs throughout time. Cooling clusters over time (making them unavailable) creates room for the remaining clusters to find better configurations.

With this modification, modified K-means cluster determiner 1402 can overestimate the number of clusters k, and the K-means clustering algorithm is still enabled to finish within a relatively short amount of time, with a reasonable number of clusters.

B. Example Embodiments for Sorting Software Failures into Failure Buckets

Once a set of software failure buckets is established, failure categorizer 118 of FIG. 1 may categorize received software failures into the established failure buckets. Portions of three example failure buckets are shown below, each with an indication of a number of software failures sorted therein, and a description of the software failure associated with the failure bucket:

Failure Bucket 1-91 Software Failures
Description: Operation was expected to complete: OperationID:db7b4bb0-dccd-4ba5-9fc8-52e76cba5035 OperationTrackingUrl: https://xrptestwinfabric-480d6a.cloudapp.net: 19009/subscriptions/1f333 e3f-a37f-4188-b426-6beae545a70a/providers/ Microsoft.Compute/locations/westus/operations/ db7b4bb0-dccd-4ba5-9*fc*8-52e76cba5035?api-version=2014-12-01-preview
[HRESULT: 0x8013153B]. Test operation failed: 'Microsoft.Azure.CRP.Test.ScenarioTests.VMScenarioTests. SingleVMFlowOperationTests.VMOperationFlowOne VM#0'

Failure Bucket 2-6 Software Failures
Description: One or more errors occurred.
[HRESULT: 0x80131500]. Test operation failed: 'Microsoft.Azure.CRP.Test.ScenarioTests.SubscriptionLifecycleTests.SubscriptionManagementTests.PutSubscription_SuspendSubscription_VMCleanup'

Failure Bucket 3-3 Software Failures
Description: IsTrue—[1/13/2015 9:02:51][60][14]Verifying Instance View VM Provisioning State ProvisioningState/ failed/StorageAccountLimitation is in succeeded, creating
[HRESULT: 0x80131604]. Test operation failed: 'Microsoft.Azure.CRP.Test.ScenarioTests.VMScenarioTests.OsProfileScenarioTests.CreateVM_PIRImage_ZRSStorageAccount'

The above test pass results shows how 114 test failures are bucketed into 10 buckets (only three failure buckets are shown above for ease of illustration). Failure bucket 1 contains ~80% (91/114) of the failures. The description shown for each failure bucket is a preview (e.g., the first 4 lines of a random software failure in the bucket). Note that this description text may vary from failure to failure, even within the same failure bucket.

Figure 16:
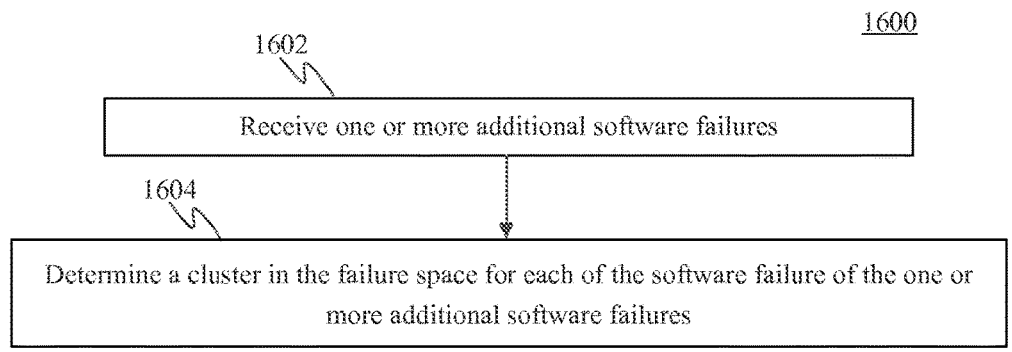
FIG. 16 shows a flowchart providing a process for assigning software failures to buckets, according to an example embodiment.
Figure 17:
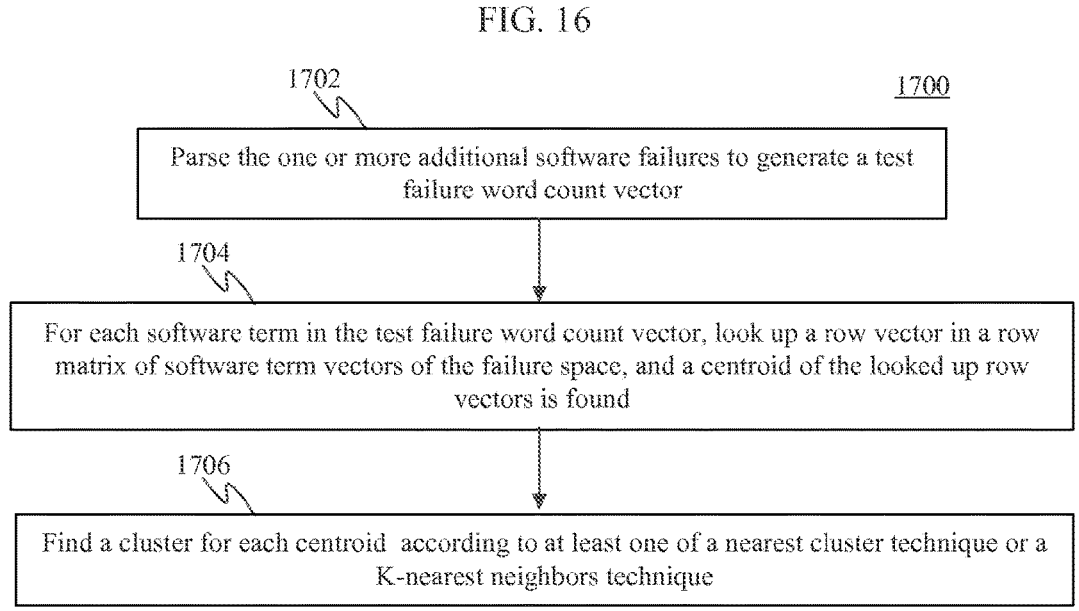
FIG. 17 shows a flowchart providing a process for assigning software failures to buckets, according to an example embodiment.
Figure 18:
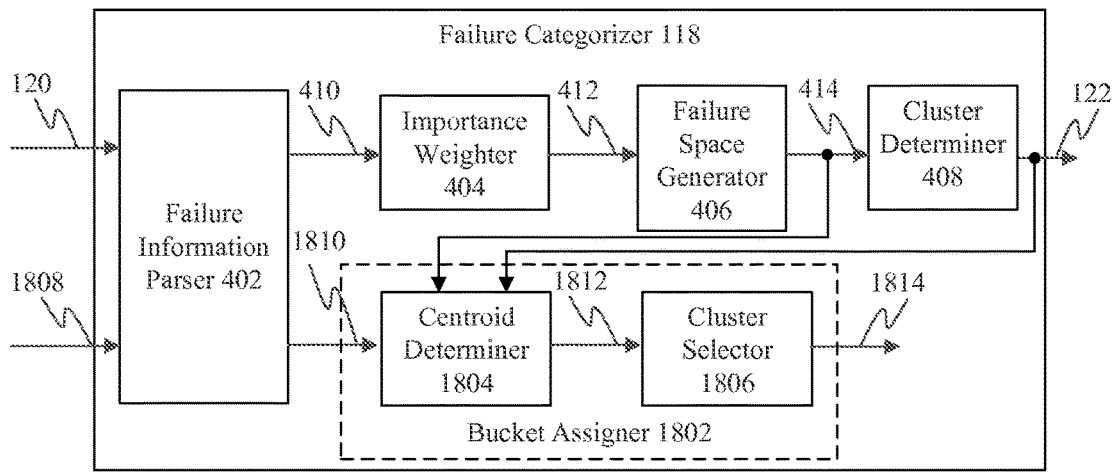
FIG. 18 shows a block diagram of a failure categorizer configured to generate buckets for grouping software failures and to assign software failures to the buckets, according to an example embodiment.

Incoming software test failures may be sorted into failure buckets in various ways, in embodiments. For instance, FIG. 16 shows a flowchart 1600 providing a process for assigning software failures into buckets, according to an example embodiment. FIG. 17 shows a flowchart 1700 that is an example embodiment of flowchart 1600. Flowcharts 1600 and 1700 are described with respect to FIG. 18. FIG. 18 shows a block diagram of failure categorizer 118 configured to generate failure buckets and to assign software failures to the buckets, according to an example embodiment. As shown in FIG. 18, failure categorizer 118 includes the features of feature categorizer 118 of FIG. 4, with the addition of a bucket assigner 1802. Bucket assigner 1802 includes a centroid determiner 1804 and a cluster selector 1806. In embodiments, flowcharts 1600 and 1700 may be performed by failure information parser 402 and bucket assigner 1802 of FIG. 18. Flowcharts 1600 and 1700 and bucket assigner 1802 of FIG. 18 are described as follows.

Flowchart 1600 begins with step 1602. In step 1602, one or more additional software failures are received. As shown in FIG. 18, bucket assigner 1802 may receive one or more additional software failures 1808 as a set T. Software failures 1808 are similar to software failures 124a and 124b in FIG. 1, and may be received from database 116 or directly from applications running software tests (e.g., applications 112a and 112b).

In step 1604, a cluster is determined in the failure space for each software failure of the one or more additional software failures. In an embodiment, bucket assigner 1802 is configured to assign each software failure of software failures 1808 into a corresponding failure bucket of failure buckets 122, each failure bucket being a determined cluster. For instance, bucket assigner 1802 may be configured to analyze each received software failure, and determine (e.g., by comparing software terms, etc.) which failure bucket corresponds to a most similar software failure type, and to sort the software failure into that failure bucket. As shown in FIG. 18, bucket assigner 1802 generates sorted software failures 1814, which indicates which failure bucket of failure buckets 122 that each software failure of software failures 1808 is sorted into.

Step 1604 of flowchart 1600 may be implemented in various ways to perform sort of software failures. For example, in an embodiment, flowchart 1700 of FIG. 17 may be performed in step 1604. Flowchart 1700 provides a process for predicting the failure buckets (set of clusters C) in which a set of incoming new software test failures T belong.

Flowchart 1700 begins with step 1702. In step 1702, the one or more additional software failures are parsed to generate a test failure word count vector. As shown in FIG. 18, failure information parser 402 receives software failures 1808 as set T. In an embodiment, for each software failure t included in set T, failure information parser 402 is configured to parse the test failure log of the software failure t, and to create a vector p representing the test failure word counts. Vector p is a column vector where each entry i corresponds to a term/word present in software failure t, and entry p(i) corresponds to the number of times such word appears in software failure t. Failure information parser 402 may determine the word counts in a similar manner as described above with respect to flowchart 500 (FIG. 5). As shown in FIG. 18, failure information parser 402 generates word counts 1810.

In step 1704, for each software term in the test failure word count vector, a row vector is looked up in a row matrix of software term vectors of the failure space, and finding a centroid of the looked up row vectors. As shown in FIG. 18, centroid determiner 1804 receives word counts 1810. Furthermore, centroid determiner 1804 receives failure buckets 122 (clusters c), and matrix $W_k'$ and matrix $F_k'$ of failure space 414. In an embodiment, for each word in vector p, centroid determiner 1804 is configured to look up the corresponding row vectors v0 . . . vn in row matrix $W_k'$ and find the centroid c of such row vectors, which can be calculated as shown below in Equation 6:

$$c = \text{ComputeCentroid}(v0 \ldots vn) = \frac{\sum_{i=0}^{n} v_i}{n} \qquad \text{Equation 6}$$

As shown in FIG. 18, centroid determiner 1804 generates row vectors and centroids 1812.

In step 1706, a cluster is found for each centroid according to at least one of a nearest cluster technique or a K-nearest neighbors technique. As shown in FIG. 18, cluster selector 1806 receives row vectors and centroids 1812. Cluster selector 1806 is configured to determine a cluster in clusters C for each centroid determined by step 1704, thereby determining a failure bucket for each software failure. Cluster selector 1806 may determine a cluster in various ways.

For instance, in an embodiment, cluster selector 1806 may implement a "nearest cluster" algorithm to determine a cluster for a software failure t. In such an embodiment, for each software failure t, cluster selector 1806 may be configured to find the cosine distance from the centroid vector c to each cluster center in C, and select the closest cluster as the correct bucket for software failure t.

In another embodiment, cluster selector 1806 may implement a "K-nearest neighbors algorithm" to determine a cluster for a software failure t. In such an embodiment, for each software failure t, cluster selector 1806 may be configured to find the cosine distance from the centroid vector c to all failure vectors $f_j$ in column matrix and select the closest k software failures. Cluster selector 1806 may perform a majority vote on such closest failures clusters, which means assigning the most common failure bucket in the closest failure clusters to be the failure bucket for software failure t.

In each case, the cosine distance may be determined by cluster selector 1806 according to Equation 7 below:

$$\text{CosineDistance}(c, f_j) = \frac{f_j * c}{|f_j||c|} \qquad \text{Equation 7}$$

Note, to find the top similar failures to software failure t, the top k closest failures resulting from the above step may be selected.

Accordingly, cluster selector 1806 generates sorted software failures 1814, also referred to as failure buckets B(t), which indicates the failure bucket of failure buckets 122 for each software failure t included in set T (software failures 1808).

If desired, a visualization of the high dimensional failure space may be generated by failure categorizer 118. The visualization may be used to approximate the high dimensional failure space onto a two-dimensional (2D) graph that uses colors and spatial node proximity among failures according to edge weights to represent failure relationships and failure buckets. For instance, each failure vector may be represented by a small circle, all with the same size.

For instance, to generate the 2D graph from the high dimensional failure space, the following example technique may be used: For each failure in $F_k'$ (columns), select neighboring failures that lie within a specified threshold cosine_distance (e.g. <=0.3, which means very close or similar). Add an edge between the failure and its neighboring failure selected with weight equal to (1−cosine_distance) so that weight is higher (~1) when a failure is really close (~0 cosine_distance) to a neighboring failure.

Note that cosine_distance ranges from [0,1] because all vectors lie in positive space due to the original raw matrix Draw, which includes no negative numbers. Therefore the SVD computation described above results in matrices $W_k'$, and $F_k'$ that have vectors all in positive space, and therefore cosine similarity is in the range [0,1].

Each edge between each failure has a weight that ranges from [0,1], where higher weight means a closer distance in high dimension, and hence a stronger relationship in the failure space graph because the weight is higher between such nodes.

Software failures in the 2D graph may be colored based on which cluster they are sorted into, with each cluster assigned a different color.

III. Example Mobile and Stationary Device Embodiments

Computing devices 102a, 102b, 104, and 106, clients 110a and 110b, failure categorizer 118, failure information parser 402, importance weighter 404, failure space generator 406, cluster determiner 408, stack trace frame parser 602, word remover 604, word quantifier 606, TF-IDF weight generator 802, LSA vector generator 1002, SVD engine 1202, dimension reducer 1204, matrices combiner 1206, modified K-means cluster determiner 1402, bucket assigner 1802, centroid determiner 1804, cluster selector 1806, flowchart 200, flowchart 300, flowchart 500, step 702, step 902, step 1302, flowchart 1500, flowchart 1600, and flowchart 1700 may be implemented in hardware, or hardware combined with software and/or firmware. For example, failure categorizer 118, failure information parser 402, importance weighter 404, failure space generator 406, cluster determiner 408, stack trace frame parser 602, word remover 604, word quantifier 606, TF-IDF weight generator 802, LSA vector generator 1002, SVD engine 1202, dimension reducer 1204, matrices combiner 1206, modified K-means cluster determiner 1402, bucket assigner 1802, centroid determiner 1804, cluster selector 1806, flowchart 200, flowchart 300, flowchart 500, step 702, step 902, step 1302, flowchart 1500, flowchart 1600, and/or flowchart 1700 may be implemented as computer program code/instructions configured to be executed in one or more processors and stored in a computer readable storage medium. Alternatively, failure categorizer 118, failure information parser 402, importance weighter 404, failure space generator 406, cluster determiner 408, stack trace frame parser 602, word remover 604, word quantifier 606, TF-IDF weight generator 802, LSA vector generator 1002, SVD engine 1202, dimension reducer 1204, matrices combiner 1206, modified K-means cluster determiner 1402, bucket assigner 1802, centroid determiner 1804, cluster selector 1806, flowchart 200, flowchart 300, flowchart 500, step 702, step 902, step 1302, flowchart 1500, flowchart 1600, and/or flowchart 1700 may be implemented as hardware logic/electrical circuitry.

For instance, in an embodiment, one or more, in any combination, of failure categorizer 118, failure information parser 402, importance weighter 404, failure space generator 406, cluster determiner 408, stack trace frame parser 602, word remover 604, word quantifier 606, TF-IDF weight generator 802, LSA vector generator 1002, SVD engine 1202, dimension reducer 1204, matrices combiner 1206, modified K-means cluster determiner 1402, bucket assigner 1802, centroid determiner 1804, cluster selector 1806, flowchart 200, flowchart 300, flowchart 500, step 702, step 902, step 1302, flowchart 1500, flowchart 1600, and/or flowchart 1700 may be implemented together in a SoC. The SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 19:
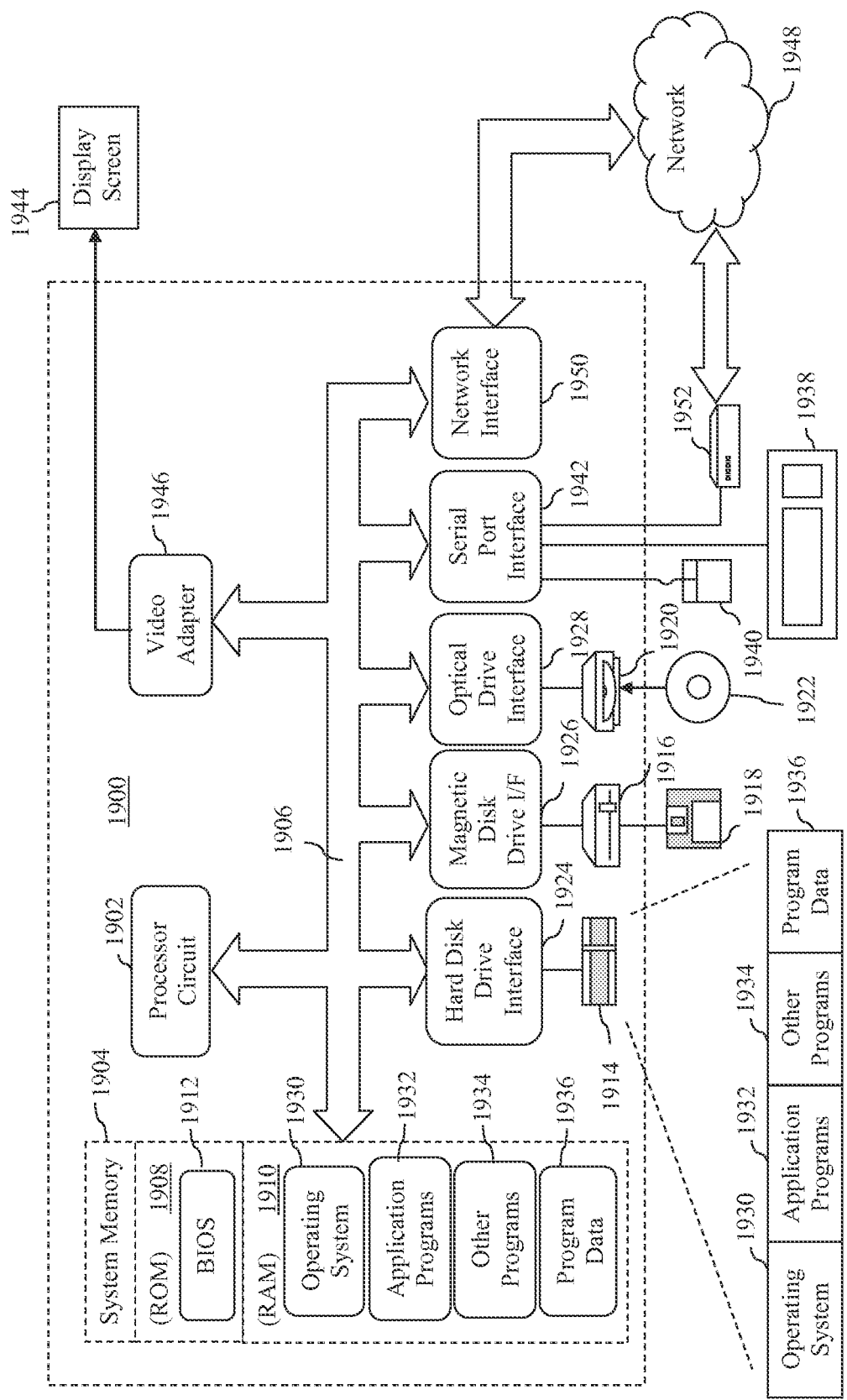
FIG. 19 shows a block diagram of an example computing device that may be used to implement embodiments.

FIG. 19 depicts an exemplary implementation of a computing device 1900 in which embodiments may be implemented. For example, any of computing devices 102a, 102b, 104, and 106, and clients 110a and 110b may be implemented in one or more computing devices similar to computing device 1900 in stationary or mobile computer embodiments, including one or more features of computing device 1900 and/or alternative features. The description of computing device 1900 provided herein is provided for purposes of illustration, and is not intended to be limiting. Embodiments may be implemented in further types of computer systems, as would be known to persons skilled in the relevant art(s).

As shown in FIG. 19, computing device 1900 includes one or more processors, referred to as processor circuit 1902, a system memory 1904, and a bus 1906 that couples various system components including system memory 1904 to processor circuit 1902. Processor circuit 1902 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1902 may execute program code stored in a computer readable medium, such as program code of operating system 1930, application programs 1932, other programs 1934, etc. Bus 1906 represents one or more of any of several types of bus structures, including a memory bus or memory controller, a peripheral bus, an accelerated graphics port, and a processor or local bus using any of a variety of bus architectures. System memory 1904 includes read only memory (ROM) 1908 and random access memory (RAM) 1910. A basic input/output system 1912 (BIOS) is stored in ROM 1908.

Computing device 1900 also has one or more of the following drives: a hard disk drive 1914 for reading from and writing to a hard disk, a magnetic disk drive 1916 for reading from or writing to a removable magnetic disk 1918, and an optical disk drive 1920 for reading from or writing to a removable optical disk 1922 such as a CD ROM, DVD ROM, or other optical media. Hard disk drive 1914, magnetic disk drive 1916, and optical disk drive 1920 are connected to bus 1906 by a hard disk drive interface 1924, a magnetic disk drive interface 1926, and an optical drive interface 1928, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1930, one or more application programs 1932, other programs 1934, and program data 1936. Application programs 1932 or other programs 1934 may include, for example, computer program logic (e.g., computer program code or instructions) for implementing failure categorizer 118, failure information parser 402, importance weighter 404, failure space generator 406, cluster determiner 408, stack trace frame parser 602, word remover 604, word quantifier 606, TF-IDF weight generator 802, LSA vector generator 1002, SVD engine 1202, dimension reducer 1204, matrices combiner 1206, modified K-means cluster determiner 1402, bucket assigner 1802, centroid determiner 1804, cluster selector 1806, flowchart 200, flowchart 300, flowchart 500, step 702, step 902, step 1302, flowchart 1500, flowchart 1600, and/or flowchart 1700 (including any suitable step of flowcharts 200, 300, 500, 1500, 1600, 1700), and/or further embodiments described herein.

A user may enter commands and information into the computing device 1900 through input devices such as keyboard 1938 and pointing device 1940. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1902 through a serial port interface 1942 that is coupled to bus 1906, but may be connected by other interfaces, such as a parallel port, game port, or a universal serial bus (USB).

A display screen 1944 is also connected to bus 1906 via an interface, such as a video adapter 1946. Display screen 1944 may be external to, or incorporated in computing device 1900. Display screen 1944 may display information, as well as being a user interface for receiving user commands and/or other information (e.g., by touch, finger gestures, virtual keyboard, etc.). In addition to display screen 1944, computing device 1900 may include other peripheral output devices (not shown) such as speakers and printers.

Computing device 1900 is connected to a network 1948 (e.g., the Internet) through an adaptor or network interface 1950, a modem 1952, or other means for establishing communications over the network. Modem 1952, which may be internal or external, may be connected to bus 1906 via serial port interface 1942, as shown in FIG. 19, or may be connected to bus 1906 using another interface type, including a parallel interface.

As used herein, the terms "computer program medium," "computer-readable medium," and "computer-readable storage medium" are used to refer to physical hardware media such as the hard disk associated with hard disk drive 1914, removable magnetic disk 1918, removable optical disk 1922, other physical hardware media such as RAMs, ROMs, flash memory cards, digital video disks, zip disks, MEMs, nanotechnology-based storage devices, and further types of physical/tangible hardware storage media (including memory 1220 of FIG. 12). Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 1932 and other programs 1934) may be stored on the hard disk, magnetic disk, optical disk, ROM, RAM, or other hardware storage medium. Such computer programs may also be received via network interface 1950, serial port interface 1942, or any other interface type. Such computer programs, when executed or loaded by an application, enable computing device 1900 to implement features of embodiments discussed herein. Accordingly, such computer programs represent controllers of the computing device 1900.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

V. Further Example Embodiments

In an embodiment, a method comprises: receiving software failure information; parsing the software failure information to generate a raw matrix of software terms, software failures, and an indication of a number of times each software term was found in each software failure; determining an importance of each software term of the raw matrix with respect to the software failures of the raw matrix to generate a weighted matrix; generating a failure space based on the determined importance that indicates each software term-software failure pair of the weighted matrix as a vector; and determining a set of clusters representing the vectors in the failure space.

In an embodiment, the software failure information includes a plurality of failure stack trace frames, each failure stack trace frame corresponding to a software failure, said parsing comprising: parsing each failure stack trace frame into a plurality of logical words that indicate information about the corresponding software failure; removing one or more low information words from the plurality of logical words; and quantifying the logical words into a set of aliases to generate the software terms and the indication of a number of times each software term was found in each software failure.

In an embodiment, the determining an importance of each software term of the raw matrix with respect to the software failures of the raw matrix to generate a weighted matrix comprises: applying TF-IDF (term frequency-inverse document frequency) weighting to the raw matrix to generate a TF-IDF weighting to each software term of the raw matrix.

In an embodiment, the generating a failure space based on the determined importance that indicates each software term-software failure pair of the weighted matrix as a vector comprises: performing latent semantic analysis on the weighted matrix to generate the vector for each software term-software failure pair.

In an embodiment, the performing latent semantic analysis on the weighted matrix to generate the vector for each software term-software failure pair comprises: performing singular value decomposition to generate a set of matrices, a product of the set of matrices approximating the weighted matrix; reducing a number of dimensions of the set of matrices; and computationally combining the set of matrices to generate the failure space indicating the software term-software failure pairs as vectors.

In an embodiment, the failure space is a k-dimensional failure space and includes a column matrix containing columns representing software failures, said determining a set of clusters representing the vectors in the failure space comprises: clustering software failures from the column matrix using a modified K-Means clustering algorithm.

In an embodiment, the clustering comprises: performing edge detection to precompute a number k of clusters; performing a modified K-Means clustering algorithm on the precomputed number k of clusters, including determining at least one cluster for elimination during at least one iteration of clustering performed during the modified K-means clustering algorithm using a cluster cooling chamber technique.

In an embodiment, the method further comprises: receiving one or more additional software failures; and determining a cluster in the failure space for each software failure of the one or more additional software failures.

In an embodiment, the determining a cluster in the failure space for each software failure of the one or more additional software failures comprises: parsing the one or more additional software failures to generate a test failure word count vector; for each software term in the test failure word count vector, looking up a row vector in a row matrix of software term vectors of the failure space, and finding a centroid of the looked up row vectors; and finding a cluster for each centroid according to at least one of a nearest cluster technique or a K-nearest neighbors technique.

In another embodiment, a computing device comprises: at least one processor circuit; and at least one memory that stores program code configured to be executed by the at least one processor circuit to perform acts comprising: parsing received software failure information to generate a raw matrix of software terms, software failures, and an indication of a number of times each software term was found in each software failure; determining an importance of each software term of the raw matrix with respect to the software failures of the raw matrix to generate a weighted matrix; generating a failure space based on the determined importance that indicates each software term-software failure pair of the weighted matrix as a vector; and determining a set of clusters representing the vectors in the failure space.

In an embodiment, the software failure information includes a plurality of failure stack trace frames, each failure stack trace frame corresponding to a software failure, said parsing comprising: parsing each failure stack trace frame into a plurality of logical words that indicate information about the corresponding software failure; removing one or more low information words from the plurality of logical words; and quantifying the logical words into a set of aliases to generate the software terms and the indication of a number of times each software term was found in each software failure.

In an embodiment, the determining an importance of each software term of the raw matrix with respect to the software failures of the raw matrix to generate a weighted matrix comprises: applying TF-IDF (term frequency-inverse document frequency) weighting to the raw matrix to generate a TF-IDF weighting to each software term of the raw matrix.

In an embodiment, the generating a failure space based on the determined importance that indicates each software term-software failure pair of the weighted matrix as a vector comprises: performing latent semantic analysis on the weighted matrix to generate the vector for each software term-software failure pair.

In an embodiment, the performing latent semantic analysis on the weighted matrix to generate the vector for each software term-software failure pair comprises: performing singular value decomposition to generate a set of matrices, a product of the set of matrices approximating the weighted matrix; reducing a number of dimensions of the set of matrices; and computationally combining the set of matrices to generate the failure space indicating the software term-software failure pairs as vectors.

In an embodiment, the failure space is a k-dimensional failure space and includes a column matrix containing columns representing software failures, said determining a set of clusters representing the vectors in the failure space comprises: clustering software failures from the column matrix using a modified K-Means clustering algorithm.

In an embodiment, the clustering comprises: performing edge detection to precompute a number k of clusters; performing a modified K-means clustering algorithm on the precomputed number k of clusters, including determining at least one cluster for elimination during at least one iteration of clustering performed during the modified K-means clustering algorithm using a cluster cooling chamber technique.

In an embodiment, the acts further comprises: receiving one or more additional software failures; and determining a cluster in the failure space for each software failure of the one or more additional software failures.

In an embodiment, the determining a cluster in the failure space for each software failure of the one or more additional software failures comprises: parsing the one or more additional software failures to generate a test failure word count vector; for each software term in the test failure word count vector, looking up a row vector in a row matrix of software term vectors of the failure space, and finding a centroid of the looked up row vectors; and finding a cluster for each centroid according to at least one of a nearest cluster technique or a K-nearest neighbors technique.

In another embodiment, a system comprises: at least one processor circuit; and at least one memory that stores program code configured to be executed by the at least one processor circuit, the program code comprising: a failure information parser configured to parse software failure information to generate a raw matrix of software terms, software failures, and an indication of a number of times each software term was found in each software failure; an importance weighter configured to determine an importance of each software term of the raw matrix with respect to the software failures of the raw matrix to generate a weighted matrix; a failure space generator configured to generate a failure space based on the determined importance that indicates each software term-software failure pair of the weighted matrix as a vector; and a cluster determiner configured to determine a set of clusters representing the vectors in the failure space.

In an embodiment, the program code further comprising: a bucket assigner configured to determine a cluster in the failure space for each software failure of one or more additional software failures.

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A method, comprising:
receiving software failure information;
parsing the software failure information to generate a raw matrix of software terms, software failures, and an indication of a number of times each software term was found in each software failure;
determining an importance of each software term of the raw matrix with respect to the software failures of the raw matrix to generate a weighted matrix;
generating a failure space based on the determined importance that indicates each software term-software failure pair of the weighted matrix as a vector; and
determining a set of clusters representing the vectors in the failure space.

2. The method of claim 1, wherein the software failure information includes a plurality of failure stack trace frames, each failure stack trace frame corresponding to a software failure, said parsing comprising:
parsing each failure stack trace frame into a plurality of logical words that indicate information about the corresponding software failure;
removing one or more low information words from the plurality of logical words; and
quantifying the logical words into a set of aliases to generate the software terms and the indication of a number of times each software term was found in each software failure.

3. The method of claim 1, wherein said determining an importance of each software term of the raw matrix with respect to the software failures of the raw matrix to generate a weighted matrix comprises:
applying TF-IDF (term frequency-inverse document frequency) weighting to the raw matrix to generate a TF-IDF weighting to each software term of the raw matrix.

4. The method of claim 1, wherein said generating a failure space based on the determined importance that indicates each software term-software failure pair of the weighted matrix as a vector comprises:
performing latent semantic analysis on the weighted matrix to generate the vector for each software term-software failure pair.

5. The method of claim 4, wherein said performing latent semantic analysis on the weighted matrix to generate the vector for each software term-software failure pair comprises:
performing singular value decomposition to generate a set of matrices, a product of the set of matrices approximating the weighted matrix;
reducing a number of dimensions of the set of matrices; and
computationally combining the set of matrices to generate the failure space indicating the software term-software failure pairs as vectors.

6. The method of claim 1, wherein the failure space is a k-dimensional failure space and includes a column matrix containing columns representing software failures, said determining a set of clusters representing the vectors in the failure space comprises:
clustering software failures from the column matrix using a modified K-Means clustering algorithm.

7. The method of claim 6, wherein said clustering comprises:
performing edge detection to precompute a number k of clusters;
performing a modified K-Means clustering algorithm on the precomputed number k of clusters, including
determining at least one cluster for elimination during at least one iteration of clustering performed during the modified K-Means clustering algorithm using a cluster cooling chamber technique.

8. The method of claim 1, further comprising:
receiving one or more additional software failures; and
determining a cluster in the failure space for each software failure of the one or more additional software failures.

9. The method of claim 8, wherein said determining a cluster in the failure space for each software failure of the one or more additional software failures comprises:
parsing the one or more additional software failures to generate a test failure word count vector;
for each software term in the test failure word count vector,
looking up a row vector in a row matrix of software term vectors of the failure space, and
finding a centroid of the looked up row vectors; and
finding a cluster for each centroid according to at least one of a nearest cluster technique or a K-nearest neighbors technique.

10. A computing device, comprising:
at least one processor circuit; and
at least one memory that stores program code configured to be executed by the at least one processor circuit to perform acts comprising:
parsing received software failure information to generate a raw matrix of software terms, software failures, and an indication of a number of times each software term was found in each software failure;
determining an importance of each software term of the raw matrix with respect to the software failures of the raw matrix to generate a weighted matrix;
generating a failure space based on the determined importance that indicates each software term-software failure pair of the weighted matrix as a vector; and
determining a set of clusters representing the vectors in the failure space.

11. The computing device of claim 10, wherein the software failure information includes a plurality of failure stack trace frames, each failure stack trace frame corresponding to a software failure, said parsing comprising:
parsing each failure stack trace frame into a plurality of logical words that indicate information about the corresponding software failure;
removing one or more low information words from the plurality of logical words; and quantifying the logical words into a set of aliases to generate the software terms and the indication of a number of times each software term was found in each software failure.

12. The computing device of claim 10, wherein said determining an importance of each software term of the raw matrix with respect to the software failures of the raw matrix to generate a weighted matrix comprises:
applying TF-IDF (term frequency-inverse document frequency) weighting to the raw matrix to generate a TF-IDF weighting to each software term of the raw matrix.

13. The computing device of claim 10, wherein said generating a failure space based on the determined importance that indicates each software term-software failure pair of the weighted matrix as a vector comprises:
performing latent semantic analysis on the weighted matrix to generate the vector for each software term-software failure pair.

14. The computing device of claim 13, wherein said performing latent semantic analysis on the weighted matrix to generate the vector for each software term-software failure pair comprises:
performing singular value decomposition to generate a set of matrices, a product of the set of matrices approximating the weighted matrix;
reducing a number of dimensions of the set of matrices; and
computationally combining the set of matrices to generate the failure space indicating the software term-software failure pairs as vectors.

15. The computing device of claim 10, wherein the failure space is a k-dimensional failure space and includes a column matrix containing columns representing software failures, said determining a set of clusters representing the vectors in the failure space comprises:
clustering software failures from the column matrix using a modified K-Means clustering algorithm.

16. The computing device of claim 15, wherein said clustering comprises:
performing edge detection to precompute a number k of clusters;
performing a modified K-Means clustering algorithm on the precomputed number k of clusters, including determining at least one cluster for elimination during at least one iteration of clustering performed during the modified K-Means clustering algorithm using a cluster cooling chamber technique.

17. The computing device of claim 10, the acts further comprising:
receiving one or more additional software failures; and
determining a cluster in the failure space for each software failure of the one or more additional software failures.

18. The computing device of claim 17, wherein said determining a cluster in the failure space for each software failure of the one or more additional software failures comprises:
parsing the one or more additional software failures to generate a test failure word count vector;
for each software term in the test failure word count vector,
looking up a row vector in a row matrix of software term vectors of the failure space, and
finding a centroid of the looked up row vectors; and
finding a cluster for each centroid according to at least one of a nearest cluster technique or a K-nearest neighbors technique.

19. A system, comprising:
at least one processor circuit; and
at least one memory that stores program code configured to be executed by the at least one processor circuit, the program code comprising:
a failure information parser configured to parse software failure information to generate a raw matrix of software terms, software failures, and an indication of a number of times each software term was found in each software failure;
an importance weighter configured to determine an importance of each software term of the raw matrix with respect to the software failures of the raw matrix to generate a weighted matrix;
a failure space generator configured to generate a failure space based on the determined importance that indicates each software term-software failure pair of the weighted matrix as a vector; and
a cluster determiner configured to determine a set of clusters representing the vectors in the failure space.

20. The system of claim 19, the program code further comprising:
a bucket assigner configured to determine a cluster in the failure space for each software failure of one or more additional software failures.

* * * * *